June 21, 1927.
W. A. UTTZ, SR
1,633,144
GUMMED TAPE SERVING MACHINE
Filed March 2 1927    11 Sheets-Sheet 1
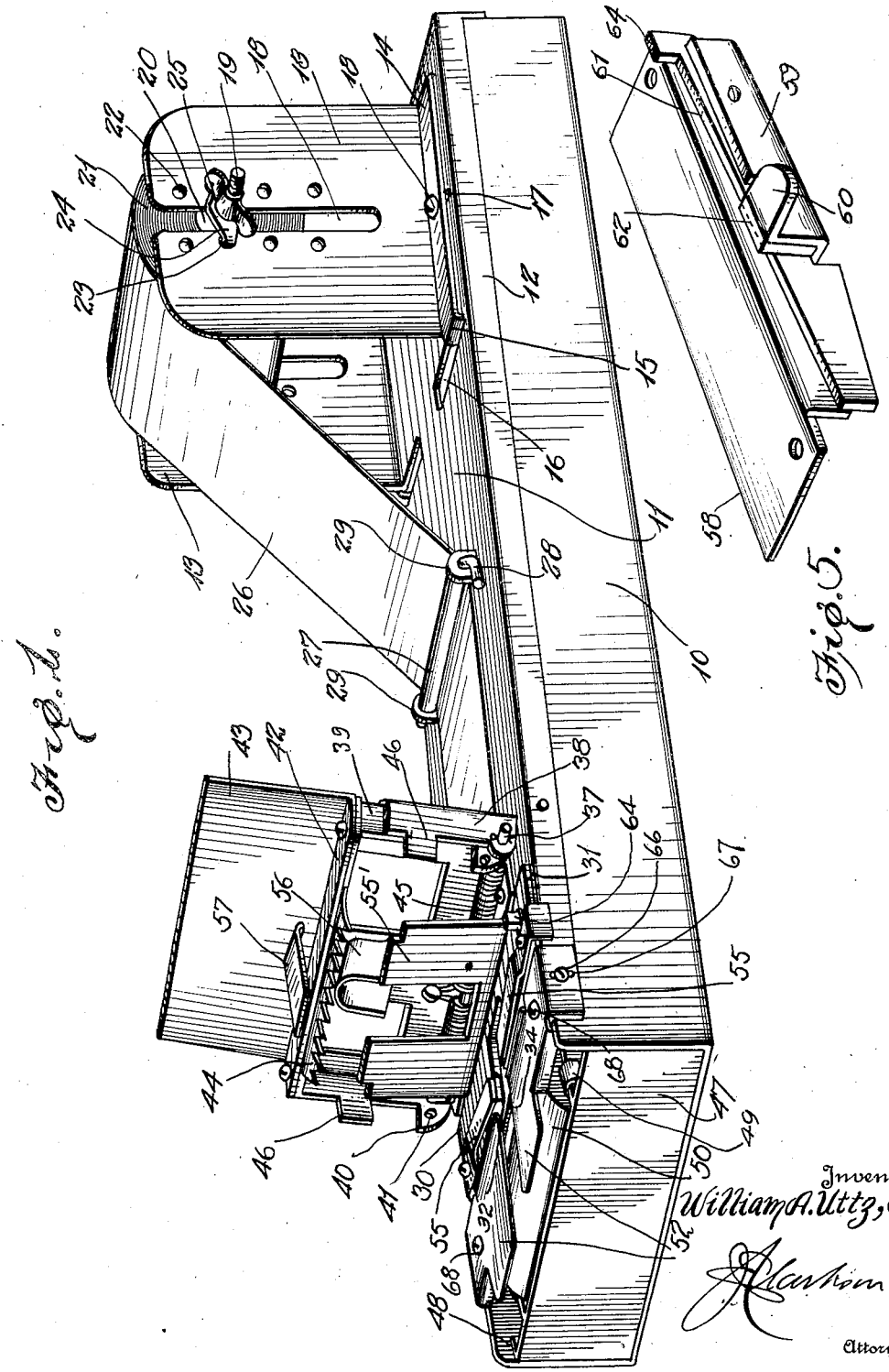
Inventor
William A. Uttz, Sr.
Attorney June 21, 1927.
W. A. UTTZ, SR
1,633,144
GUMMED TAPE SERVING MACHINE
Filed March 2 1927 11 Sheets-Sheet 2
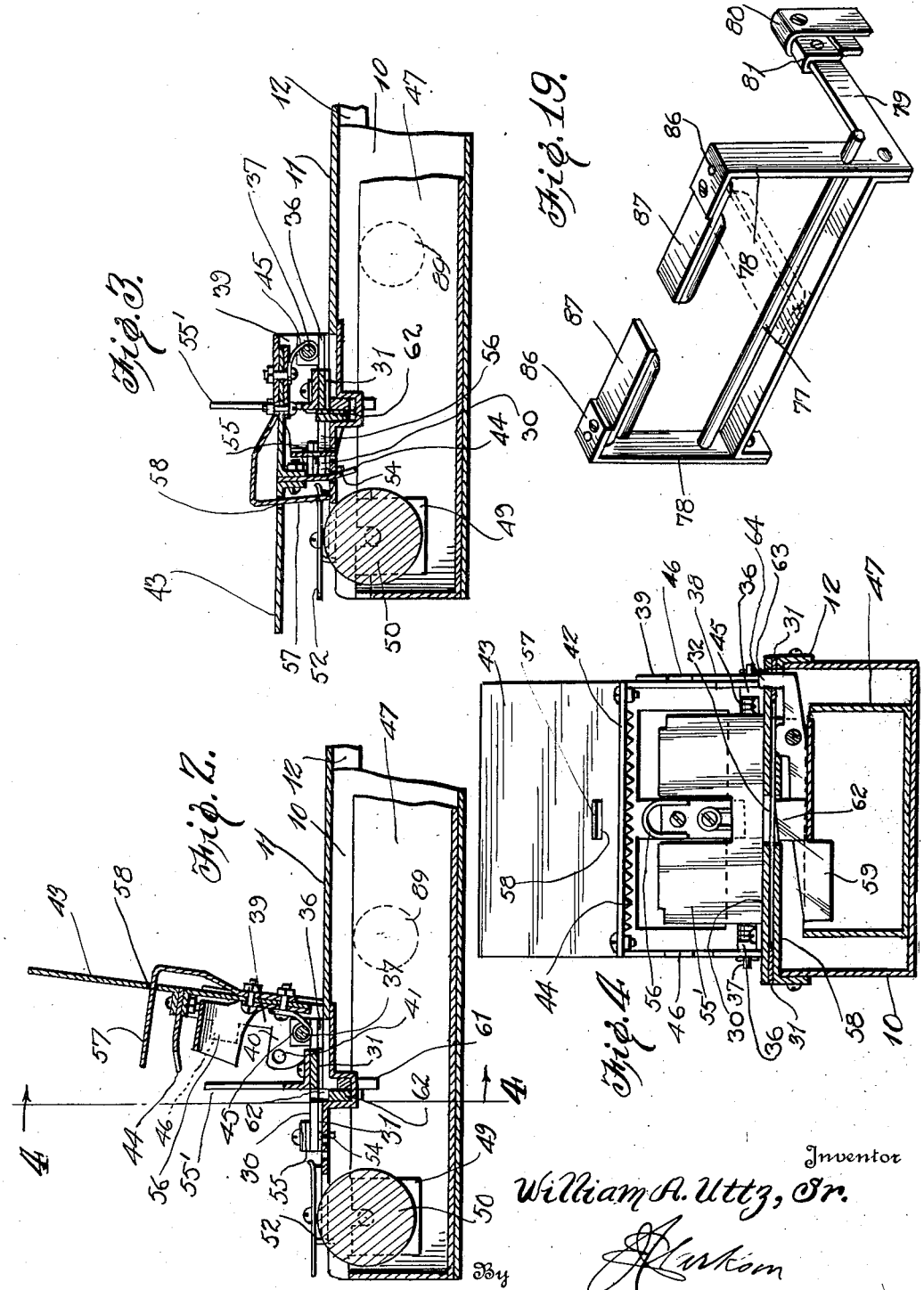
Inventor
William A. Uttz, Sr.
By
Attorney

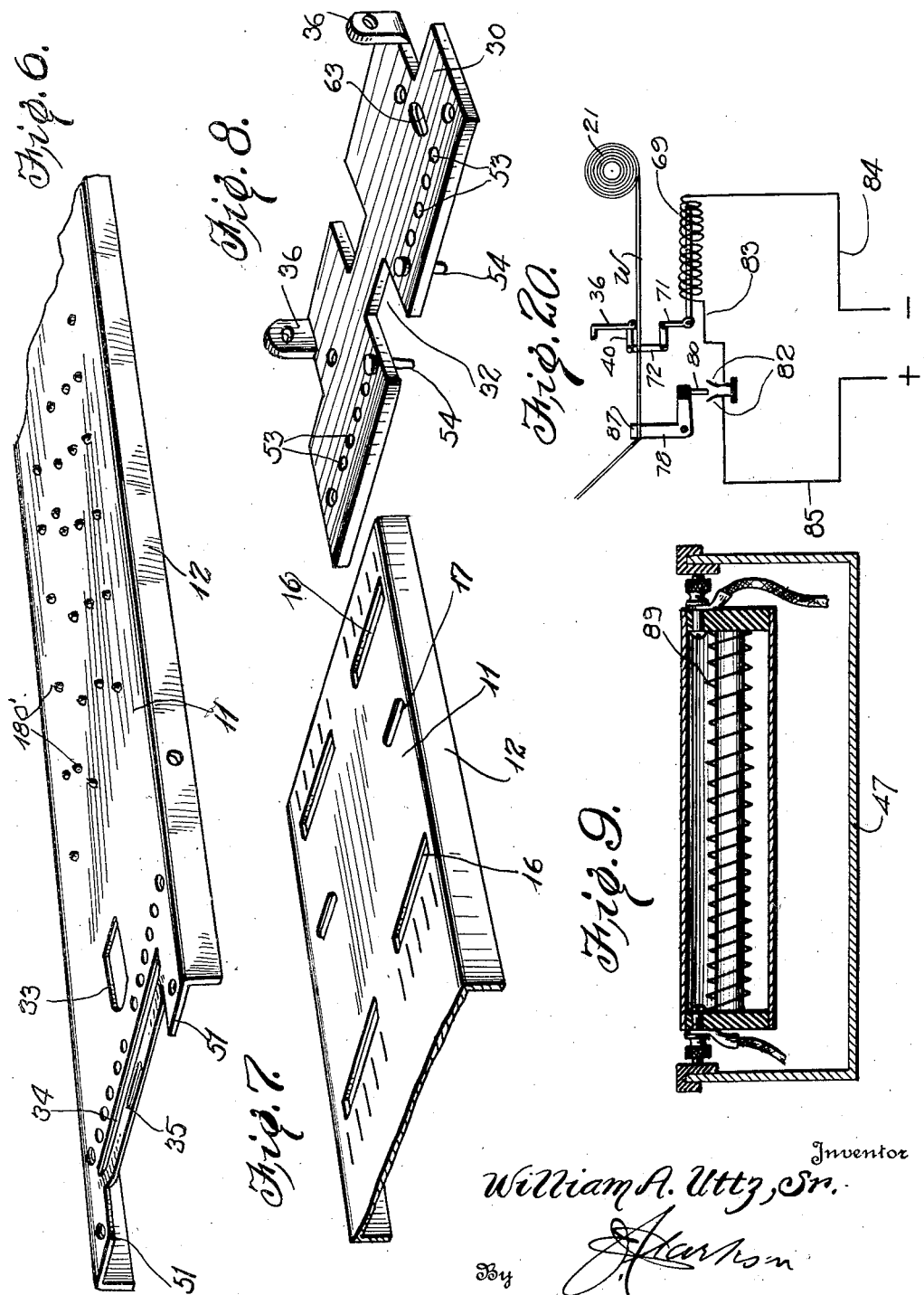

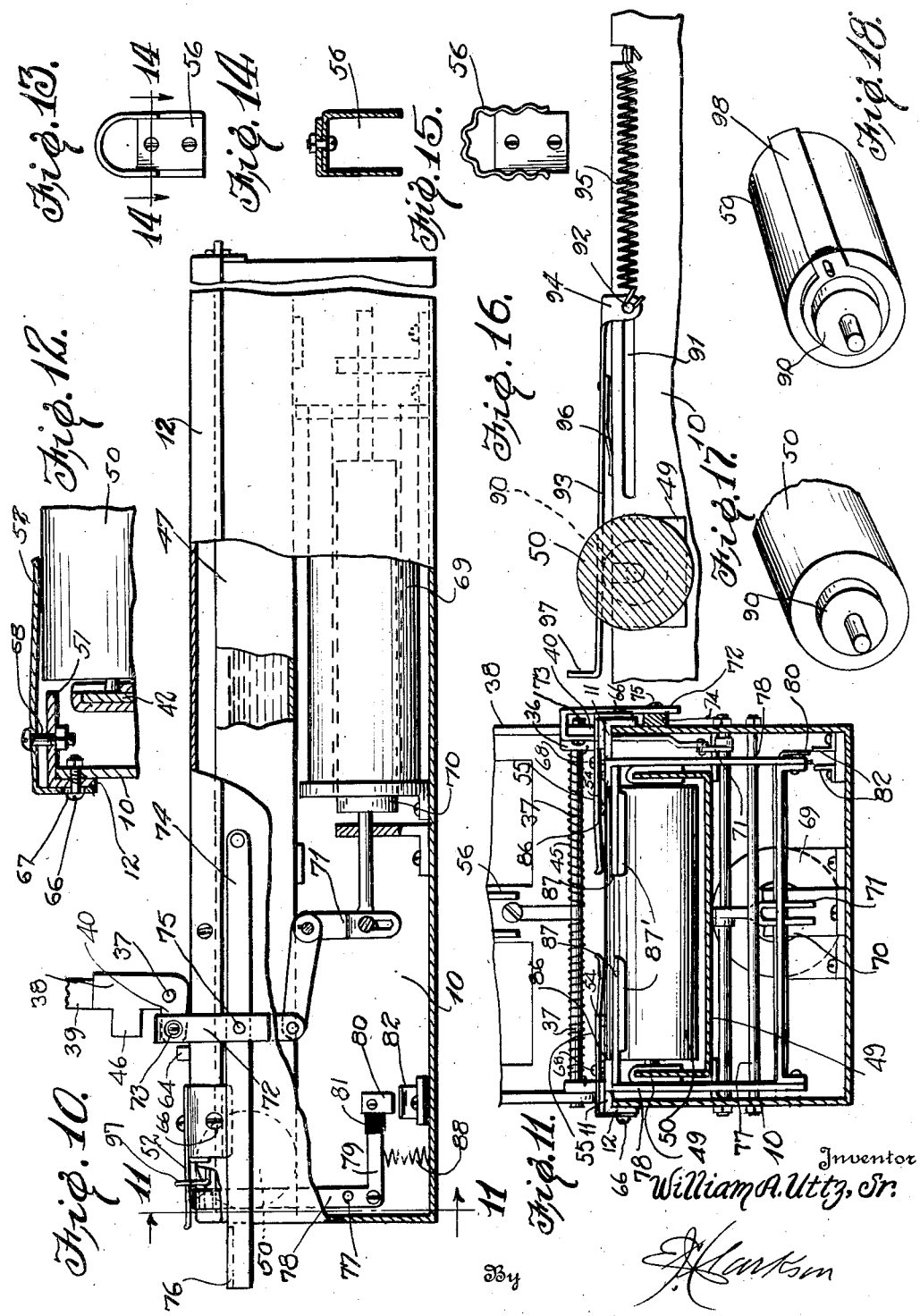

June 21, 1927.
W. A. UTTZ, SR
1,633,144
GUMMED TAPE SERVING MACHINE
Filed March 2 1927 11 Sheets-Sheet 5
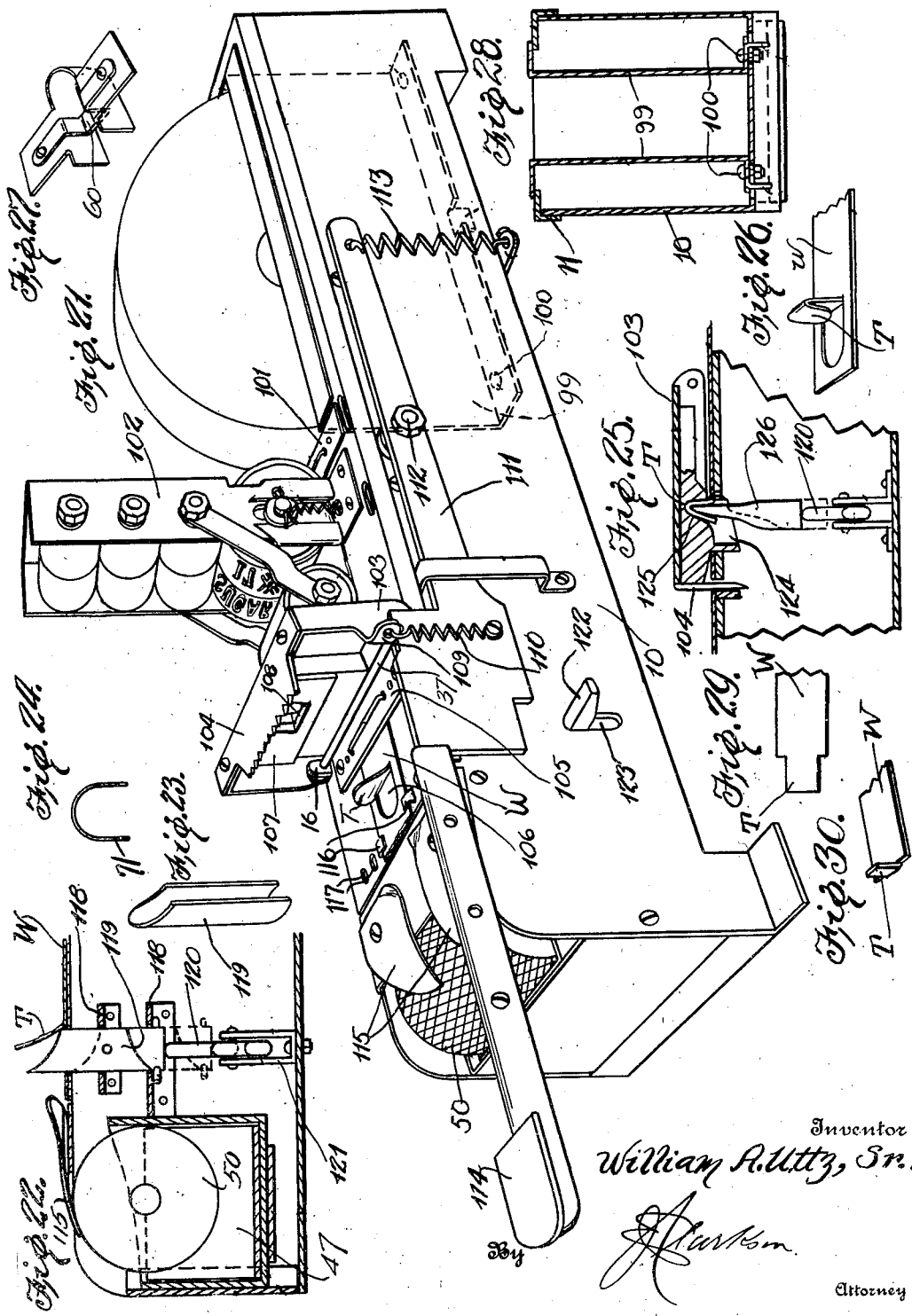
Inventor
William A. Uttz, Sr.
By
Attorney

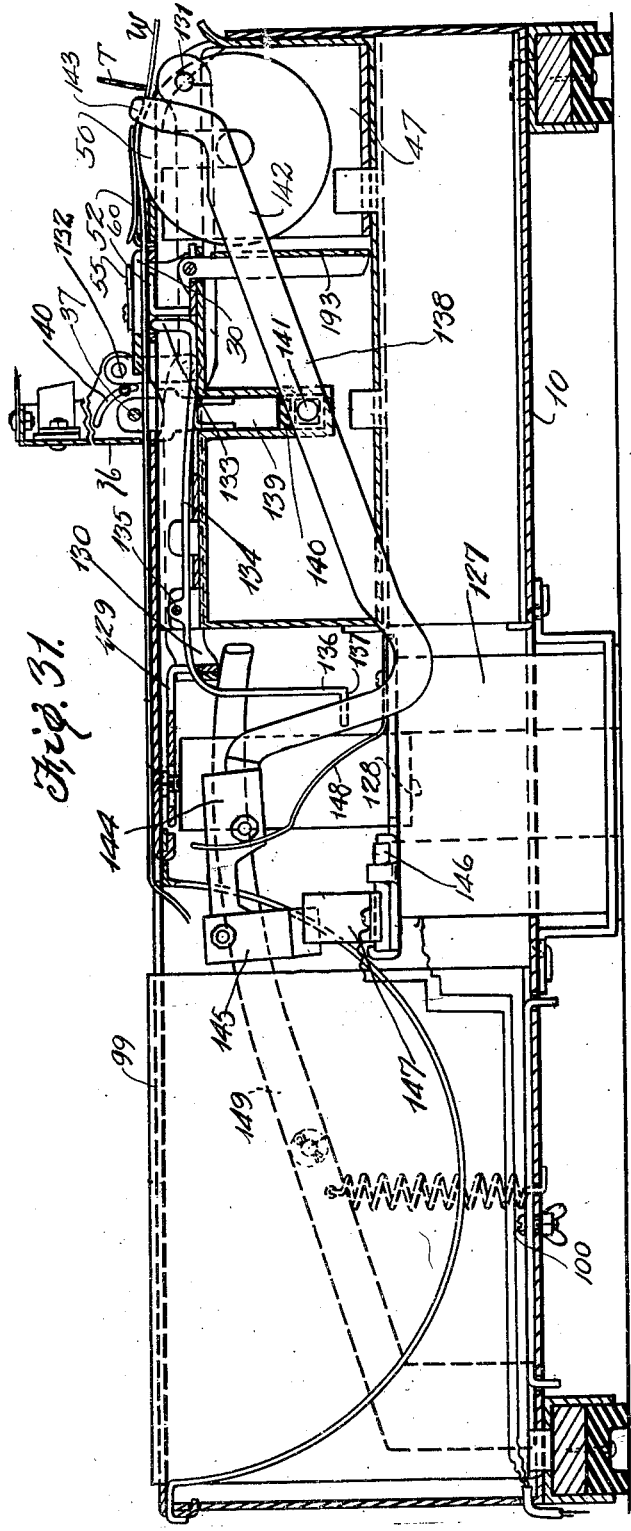
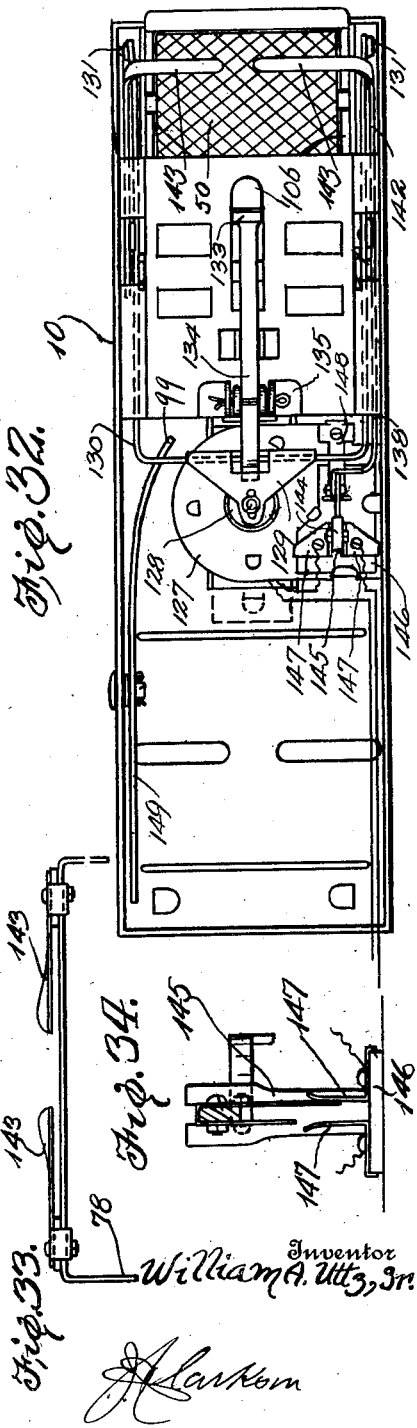

June 21, 1927.
W. A. UTTZ, SR
1,633,144
GUMMED TAPE SERVING MACHINE
Filed March 2 1927
11 Sheets-Sheet 7
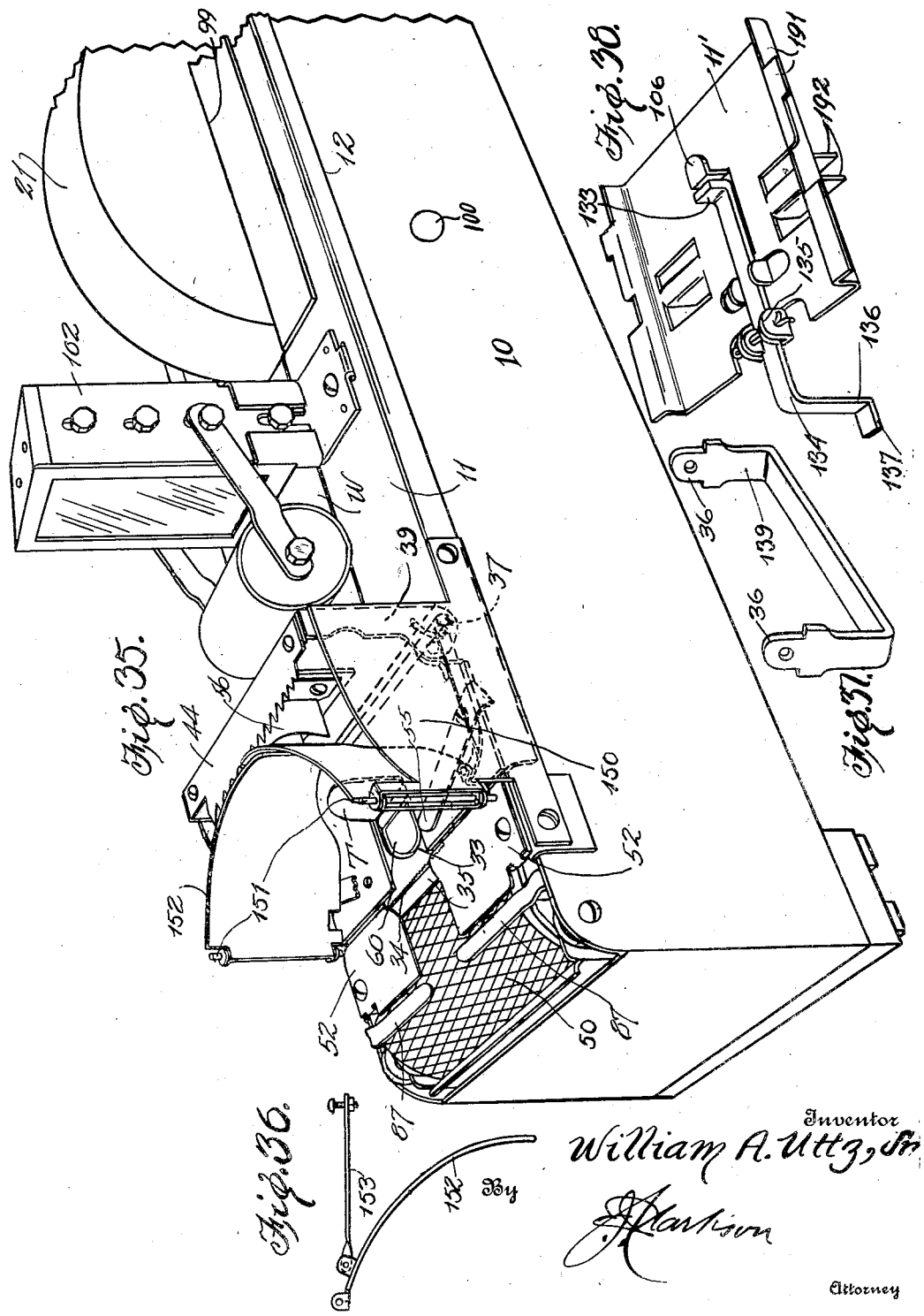

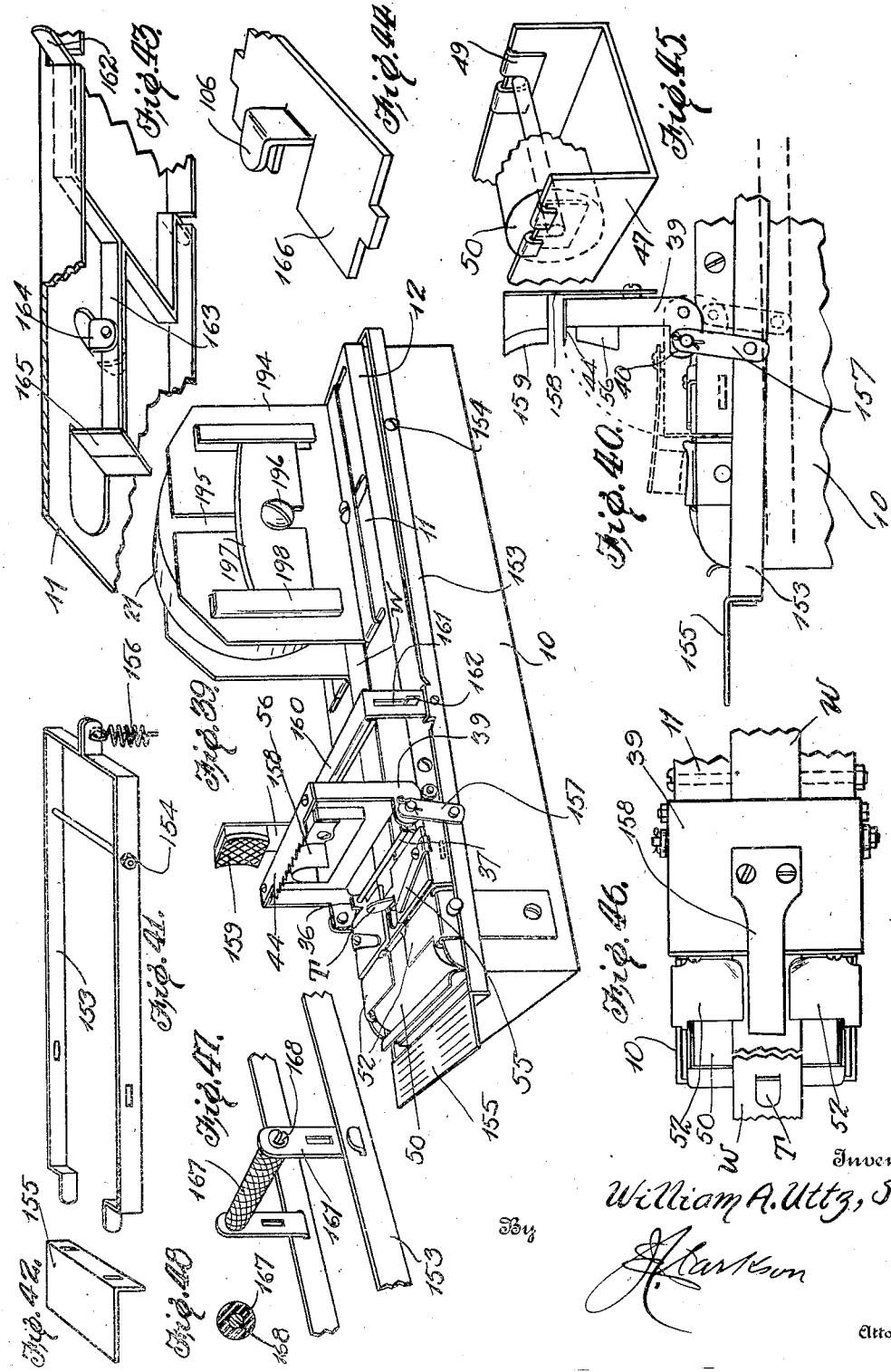

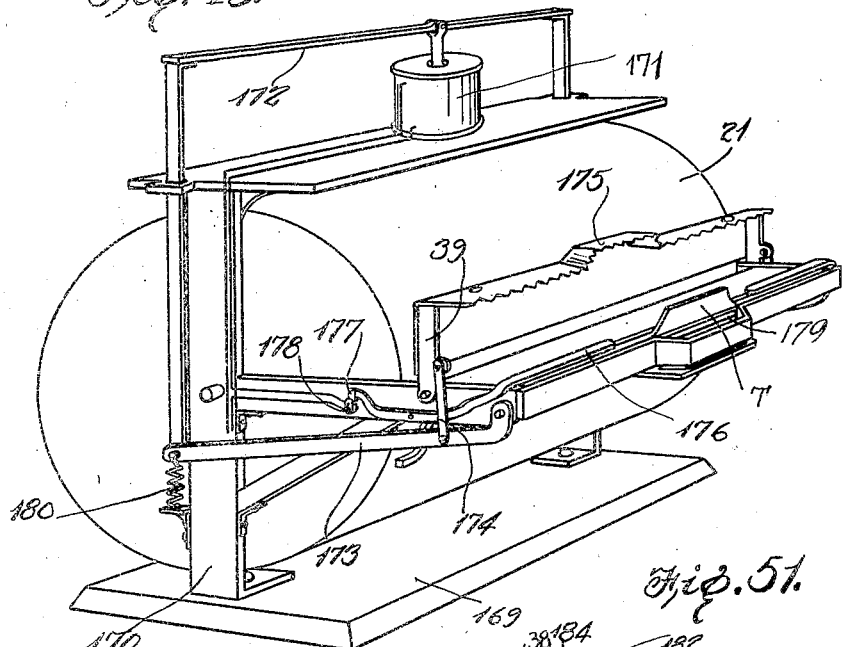
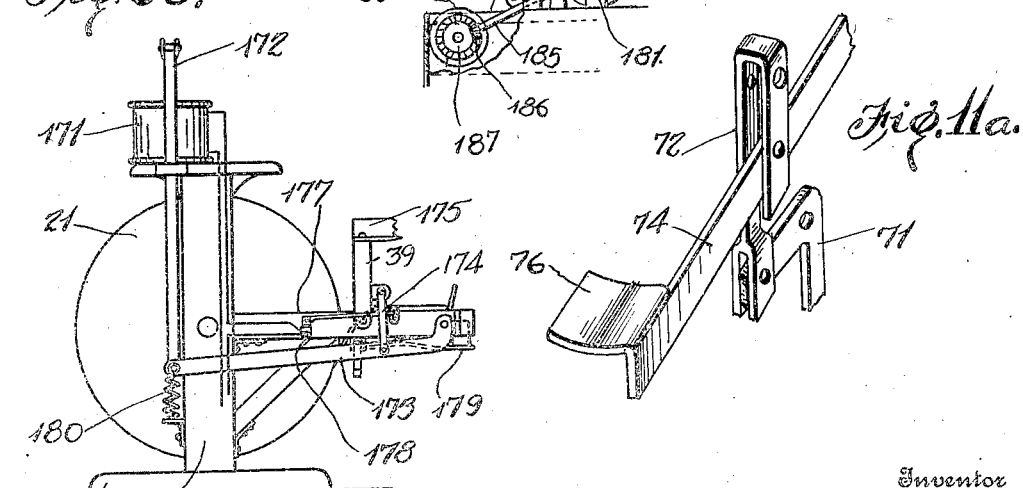

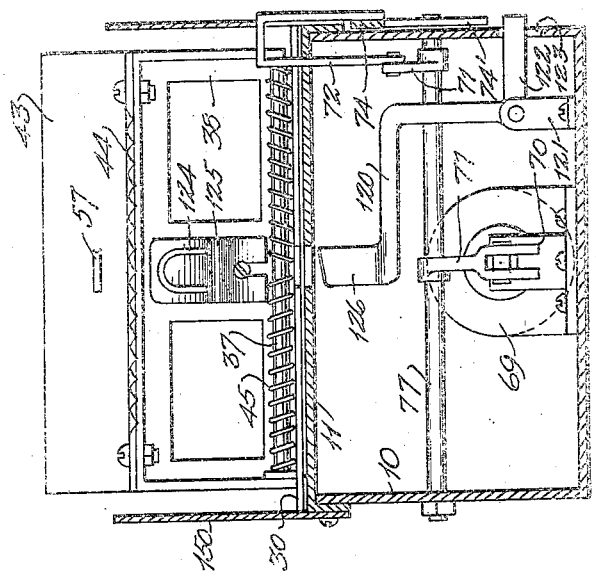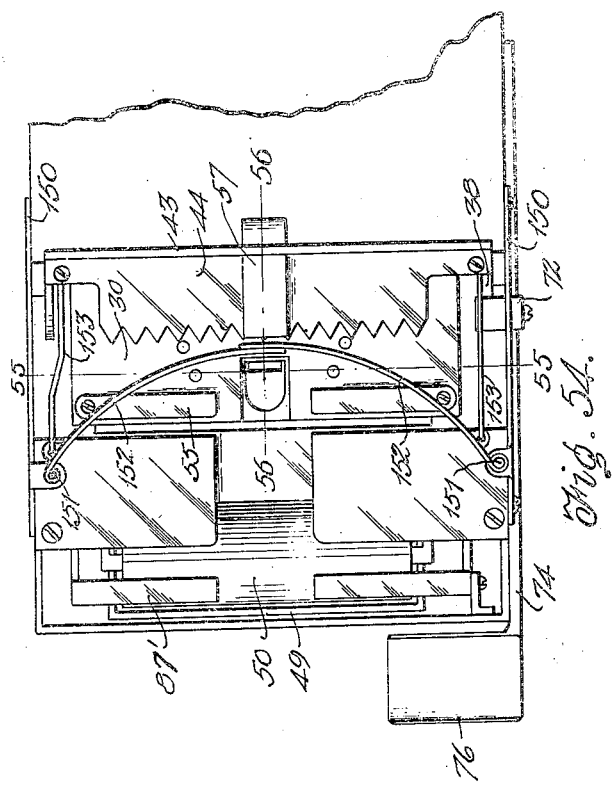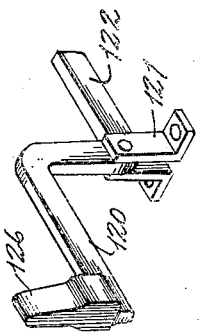

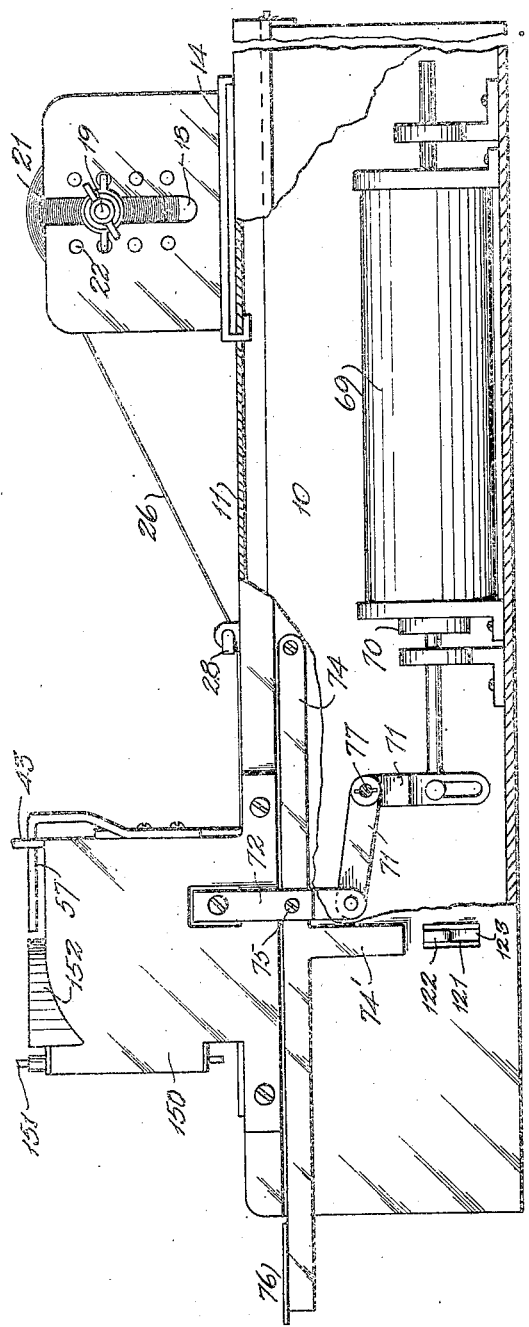
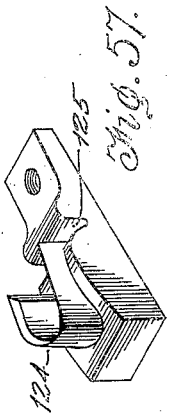
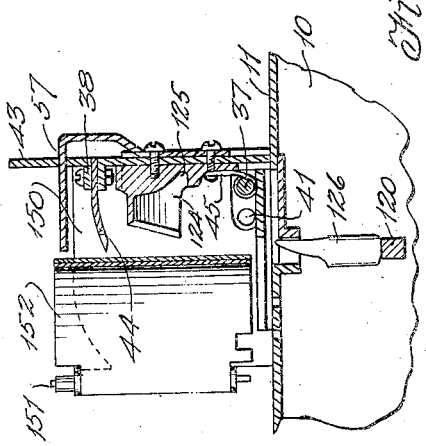

Patented June 21, 1927.

1,633,144

UNITED STATES PATENT OFFICE.

WILLIAM A. UTTZ, SR., OF FORT WORTH, TEXAS, ASSIGNOR, BY MESNE ASSIGNMENTS, TO PERFECTION PACKAGE SEALER COMPANY, A CORPORATION OF TEXAS.

GUMMED-TAPE-SERVING MACHINE.

Application filed March 2, 1927. Serial No. 172,188.

This invention relates to web dispensing machines such as are used for the serving of gummed tape, either with or without advertising, and the serving of paper from rolls, whether gummed or not.

More especially, the invention relates to improvements in the gummed tape serving machine for which a patent was granted to me on July 13, 1926, bearing the Patent Number 1,592,431.

Furthermore the invention is a continuation in part of, and substituted for, my co-pending application filed August 23, 1926, Serial No. 130,909, for gummed tape serving device.

One important object of the invention is to improve and simplify the general construction of the machine shown and described in the aforesaid patent.

A second important object of the invention is to provide and improve a machine of this character having novel hand operating means.

A third important object of the invention is to provide a machine of this character having electro-magnetic operating means.

A fourth important object of the invention is to provide a novel machine of this character wherein the machine may be operated either electrically or manually.

A fifth important object of the invention is to provide for the automatic closing of the electric operating circuit in a machine of this character.

A sixth important object of the invention is to provide novel means for closing an electric circuit in this machine, the means being of such character that they may be moved out of the path tank and moistener used herein when it is desired to remove or insert these parts.

A seventh important object of the invention is to provide a novel tab cutting arrangement for a machine of this character.

An eighth important object of the invention is to provide novel means for turning the tab upwardly from the body of the web or tape in such a machine.

A ninth important object of the invention is to provide novel means for coupling a tape as it is turned up so that the gummed surface of the tab is protected from digital contact.

A tenth important object of the invention is to provide a novel guard arrangement for the cutter of a machine of this character, together with means for operating the guard.

An eleventh important object of the invention is to provide a novel cutter arrangement which will simultaneously cut off a portion of a web or tape and form a tab for gripping with the fingers, a single cutter accomplishing both purposes.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a perspective view of one form of hand operated machine constructed in accordance with this invention.

Figure 2 is a longitudinal median section through the front or dispensing end of such a machine, the view showing the cutter raised.

Figure 3 is a view similar to Figure 2, but showing the cutter depressed.

Figure 4 is a section on the line 4—4 of Figure 2.

Figure 5 is a perspective view of the tab lifting device in the form of the invention shown in Figure 1.

Figure 6 is a perspective view of the forward end of the cover plate in the form shown in Figure 1.

Figure 7 is a perspective view of the rear end of said plate.

Figure 8 is a perspective view of the stripper and cutter supporting plate in this form of the device.

Figure 9 is a view of a tank heater adapted to be used with any form of the invention.

Figure 10 is a side elevation, partly in section, through the lower part or casting of my preferred form of electrically operated machine, the parts above the cover plate being, in general, omitted as being of the same type as those shown in Figure 1.

Figure 11 is a section on the line 11—11 of Figure 10.

Figure 11ᵃ is a perspective view of the connection between the electrically and manually operable mechanisms in the form in Figure 10.

Figure 12 is an enlarged detailed section showing the spring clips holding the web to the moistening roller.

Figure 13 is a plan view of a tab cutting knife suitable for use with this invention.

Figure 14 is a section on the line 14—14 of Figure 13.

Figure 15 is a view similar to Figure 13, but showing a modified form of knife.

Figure 16 is a detailed section showing one manner of mounting the moistening roll in the tank.

Figure 17 is a detailed perspective view of one end of said roll.

Figure 18 is a perspective view showing a water scraper for the roll.

Figure 19 is a perspective view of the movable contact member used in connection with the electrically operated device, the member being removed from the casing.

Figure 20 is a diagrammatic view of the wiring circuit used in the electrically operated form of the device.

Figure 21 is a perspective view of a second manually operable form of the invention.

Figure 22 is a longitudinal median section through the forward part of the form shown in Figure 21.

Figure 23 is a detailed perspective showing the tab cutter illustrated in Figure 22.

Figure 24 is a plan or edge view of such tab cutter.

Figure 25 is a section similar to Figure 22, but showing a modified tab forming and bending device.

Figure 26 is a perspective view illustrating a piece of tape with the modified tab shown thereon.

Figure 27 is a perspective view of a folder for use in forming this modified tab.

Figure 28 is a cross section through the roll holder in the form shown in Figure 21.

Figure 29 is an end view of a tape showing a second modification of the tab in plan.

Figure 30 is a perspective view with the tab turned up at the tape end shown in Figure 29.

Figure 31 is a longitudinal median section through a second form of electrically operated device.

Figure 32 is a plan view thereof on a reduced scale.

Figure 33 is a detailed section showing certain spring clips or guides used in connection with this form.

Figure 34 is a detailed section through the circuit closer of this form of the invention.

Figure 35 is a perspective view of a modified form of the device, adapted for electrical operation, and wherein guards are provided for the cutter blade.

Figure 36 is a detailed view, in plan, showing the operating mechanism for such guards.

Figure 37 is a detailed view of a certain bearing member used herewith.

Figure 38 is a detailed perspective showing a form of tab bending means adapted for use with this invention.

Figure 39 is a perspective view to reduced scale of a further modification of the hand operated machine.

Figure 40 is a side elevation of a portion of the front end thereof.

Figure 41 is a perspective view of the operating lever in this form of the invention.

Figure 42 is a perspective view of the finger plate in this form.

Figure 43 is a perspective view from the underside of the cover plate in this modification, and showing the tab bending means.

Figure 44 is a perspective view of the tab supporting plate used herein.

Figure 45 is a perspective view of the manner of supporting the moistening roll in this form.

Figure 46 is a plan view of a portion of the forward part of this form of the device.

Figure 47 is a perspective view of a tape gripping device used in this form.

Figure 48 is a cross section through the gripping bar device shown in Figure 47.

Figure 49 is a perspective view of the modified form of electrically operated machine especially adapted for dispensing wrapping paper.

Figure 50 is a side elevation thereof.

Figure 51 is a view showing a modified form of moistening roll operating means.

Figure 52 is a view showing a portion of the serving blade with the preferred form of teeth.

Figure 53 is a side elevation, partly in section, of a machine wherein the electrical operating means disclosed in Figure 10 is shown combined with the machine of Figure 1 and with the tab folding device of Figure 25 and the guards of Figure 35.

Figure 54 is a plan view of the forward part of the machine shown in Figure 53.

Figure 55 is a section on the line 55—55 of Figure 54.

Figure 56 is a detail section on the line 56—56 of Figure 54.

Figure 57 is a detail perspective of the tab cutter and folding die as shown in Figure 25 and as used in the combined machine of Figure 53.

Figure 58 is a perspective view of the tab bender and folder as also shown in Figure 25 and as used in the combined machine of Figure 53.

In the form of the invention shown in Figures 1 to 8, inclusive, and details of which are also shown in other figures as will be hereinafter mentioned, the base of the invention consists of a hollow box 10 open at the top and having the greater portion of the open side normally closed by a cover plate 11. This cover plate 11 terminates short of the front end of the box or base and is provided with flanges 12 extending around the base at the sides and rear thereof. At the rear end is provided a pair of supports for a roll of tape, the tape being preferably gummed tape. Each of these supports consists of a plate having an upright portion 13 provided at its lower edge with an outturned horizontal flange 14, the ends of which are bent downwardly as at 15 and fit in transverse slots 16 formed in the cover plate 11. Between these slots are other transverse slots 17 where through pass securing screws 18 provided with the usual nut (not shown) on the underside of the cover plate. By this means these two standards or slots are securely held on the cover plate and may be adjusted to proper space position in accordance with the width of the roll of paper to be carried thereby. Extending downwardly from the top edge of each plate or standard 13 is a vertical slot 18, and through these slots project the ends of a spindle 19 which passes through the usual spool 20 carrying the paper roll 21. At each side of each slot 18 are vertically spaced openings 22 which receive the lugs 23 formed on a washer plate 24, where through the threaded end of the spindle 19 projects. A butterfly nut 25 is screwed on each end of the spindle and holds these washer plates in position. It is to be noted that when heavy rolls of paper are employed it is not advisable to allow such rolls to rest on the cover plate, and the holes 22 and lugs 23 are provided so that these rolls may be suspended above the cover plate. However, when narrow paper in light rolls is used, the washer plates 24 may be turned around so that the lugs 23 do not engage in the openings and the roll rests on the cover plate, the spindle 19 falling as the roll is used up.

From the roll 21 the paper extends forwardly and downwardly as at 26 and passes beneath a guide roller 27 revolubly mounted on a pin 28 extending through ears 29 projecting up from the cover plate 11. Screwed onto the front of the cover plate 11 is a stripper plate 30, the plate being supported at slightly-spaced relation to the cover plate by means of suitable shims 31. This stripper plate is provided at its forward end with a notch 32 which registers with an opening 33 formed in the cover plate and constituting the tag or tab opening of the device. The forward edge of the stripper plate coincides with the rear edge of a slot 34 formed in the front end of the cover plate 11 and the metal of said cover plate forward of the slot is bent slightly downward as at 35 so that the paper passing from the roller 27 and beneath the plate 30 can slide over this depressed portion without catching thereon. The rear edge of the slot 34 forms the fixed die for severing the paper passing from the roll. At the rear corner of the plate 11 are provided upstanding lugs 36 where through pass a bar 37, and pivoted on this bar are angle plates 38. Fitted in the angles of these plates are the sides of a knife frame 39, having at its lower end forwardly extending arms 40 provided with openings 41 for the attachment, if desired, of manual operating means or of connections for electric operating means, as will be understood from the description of modified forms of the invention. Secured to the top of the frame 39 is the flange 42 of a finger plate 43 by means of which the frame and angle members 38 may be rocked on the bar 37. Clamped between the flange 42 and the top of the frame 39 is a cutter blade 44 having a serrated and angularly disposed cutting edge. This blade is slightly curved so that when the frame 39 is rocked forwardly the blade passes down through the slot 34. In order to hold the frame raised there is provided a coil torsion spring 45 which surrounds the bar 37, and its central portion urges the frame upwardly. On the angle bars 38 are provided stops 46 which, when the frame is rocked forwardly, engage the plate 30 and limit the movement of said frame and the parts carried thereby.

Mounted in the base 10 is a drawer 47 considerably narrower than the base, but the front of this drawer extends the full width of the base between its side walls, and is provided with flanged ends 48 which bear tightly against said side walls. Each side of the drawer has a notch in its upper edge wherein is engaged a stirrup 49, slotted to receive the journals of moistening roll 50, the drawer forming the water tank for this moistening roll. The forward end of the cover plate 11 is cut away projecting side portions 51, to which are secured the cover plates 52 for the roll 50. These cover plates bear, at their adjacent edges on the roll 50 so that the web, passing over the roll, is held firmly in contact at its edges with the roll and proper moistening is ensured. The adjacent edges of these plates are spaced to an extent corresponding to the width of the opening 33 and notch 32 for purposes which will be presently described. The plate 30 and cover plate 11 are provided with registering guide pin openings 53 and in selected openings are mounted guide pins 54 which are held in position by spring clips 55 so that the web from the roll 21 is guided by these guide pins and prevented from lateral movement at its forward end. A guard plate 55' is mounted in front of the swinging frame to prevent contact of the user's hand with the cutters, and is notched centrally so that a U-shaped tab cutter 56, secured to the frame 39, may pass through the notch and enter the opening 33 for cutting the tab simultaneously with the severing of the web by the blade 44. Secured to the frame 39 is an L-shaped spring finger 57, the end of which passes through a suitable slot 58 formed in the finger plate 43, and this end, upon depression of the cutting mechanism, engages a small notch formed in the cover plate 11 so that the paper is gripped by the spring finger during the severing operation, which will now be described.

It will not be obvious that upon the web being drawn forward it will be severed, and at the same time the cutter 56 will act to cut a U-shaped slit in the forward end of the web. Beneath the cover plate is secured a plate 58 which has a depending forward edge or flange, one part which is again turned upwardly as at 59, and carried a die lug 60 which partially fills the openings 33, the lug being of the same general shape as the opening and concentric to the forward end thereof. A U-shaped slit is thus left for the cutter 56 and the web is supported while being cut. In the channel of the plate 58 is pivoted a rocking lever 61 carrying a tab bending finger 62 which lies just behind the lug 60 and is vertically movable through the action of the lever 61. In the plate 30 there is provided an opening 63, and on the lever 61 is a lug 64 which projects upwardly through this opening into the path of the right-hand stop 46 so that, as the severing operation is accomplished, the stop strikes this lug and tilts the lever to raise the finger 62 and thereby move severed tab upward into vertical position. It will be noted that the spring finger 57, through its engagement with the cover plate, also acts to tend to lift the severing mechanism after the severing operation has been accomplished.

This constitutes the simple form of hand operated device forming one embodiment of the invention, but it is to be understood that while a simple U-shaped tab cutting knife has been here illustrated and is also shown in Figures 13 and 14, the knife may be modified, as shown in Figure 15, to provide a wavy or serrated edge. This modified form, of course, would also entail corresponding modifications of the opening 33 and lug 60 if desired. It should be mentioned that the function of the plates 52 is to ensure the web being firmly pressed downwardly on the moistening roll, and the tension of these plates may be adjusted by the mechanism shown in Figure 12, wherein it will be seen that the angle end 51 is carried by the edge of the base 10 and in turn supports the plate 52 at each side. A screw 66 holds these parts to the side of the frame, passing through a slot 67 formed in the bent end of the plate 52. A tension screw 68 passes through the horizontal portions of the plate 52 and end 51. Obviously, the adjustment of the screw 68 and of the plate 52, by means of screw 55, permits variation in the pressure between the plate 52 and roller 50. The preferred form of electrical means for operating this device, together with the means for automatically closing the operating circuit is well illustrated in Figures 10, 11 and 19. It will there be seen that the base 10 is considerably deeper than the drawer 47, so that the latter only occupies the upper part of the hollow base and affords ample room below for the presence of a solenoid 69, having a core or plunger 70 which is attached, by a pin and slot connection, with one arm of a bell crank lever 71, having its other arm connected to the lower end of a link 72 which has its upper end connected to one of the arms 40 of the cutter mechanism by means of a pin or bolt 73 passing through the opening 41 and the link 72. Under these conditions it will be obvious that movement of the bell crank 71 by energization of the solenoid 69 will draw down on the link 72 and thus rock the cutter frame to severing position. It will be observed in Figures 10 and 11 that the major part of the mechanism carried by the base is omitted because it is merely a repetition of that previously illustrated and described.

However, with the use of the electrical device, it is preferred, instead of the finger plate 43, to pivot to the side of the base a lever 74 which is connected by a pin or screw 75 with the link 72, and this lever extends forwardly of the base and terminates in a finger piece 76. In the electrical form normally the operation will be electrical but, in the event of failure of the electrical apparatus, manual operation can be had by actuating the lever 74.

In the provision of means for automatically energizing the solenoid 69, there is provided within the base a transverse bar 77 whereon is mounted a rocking frame 78 having an arm 79 extending forwardly from one end and carrying a U-shaped contact piece 80 at its forward end, carried on an insulating extension 81 supported on this arm 79. This contact finger pases downwardly between two contacts 82 as the frame 78 is tilted on the bar 77. One of these contacts 82 is connected, as shown in Figure 20, to the solenoid 69 by means of a wire 83, the other end of the solenoid being connected to a suitable line 84 from any desired source of electrical current. The remaining contact 82 is similarly connected to a like line wire 85. The side members of the frame 78 extend toward each other by angular portions 86 at the top, and pivoted beneath these angular portions are arms 87 which extend toward each other and, as can be seen in Figures 10 and 11, are positioned at the extreme forward end of the machine. A spring 88 normally holds the contact 80 raised. In the operation of this form of the device, as the web be lifted it will bear against these fingers and rock the frame 76 rearwardly at its upper portion, thus bringing the contact 80 into engagement with the contacts 82 and thereby closing the circuit through the solenoid 69. Immediately the solenoid core will be retracted and the severing mechanism will be rocked and the web severed and tab formed. As soon as the severing is completed the severed portion of the web will slip forwardly, releasing the rocking frame 78 which, under the influence of the spring 88, will regain its normal position and the circuit will be broken so that the severing mechanism will rise.

There may be associated with the water tank a suitable electrical heater such as is shown at 89 in Figure 9, so that the water is kept warm for the ready softening of the gum on the tape. At times the roll 50 becomes dry in the upper part and naturally paper pulled across the dry portion will not become moist. In order to arrange for revolution of the roll without drawing the paper thereover or applying the fingers directly to the roll, the mechanism shown in Figures 16 and 17 may be employed. It will there be seen that at one end the roll is provided with a reduced portion 90 and in one side wall of the base 10 is formed a slit 91 where through passes a pin 92 carrying a finger 93 having one end U-shaped to straddle the edge of the base 10 and to provide arms 94 through which the pin 92 passes. A coil spring 95 normally holds the pin at the rear end of the slot 91 and a flat spring 96 normally holds the forward end of the finger 93 just out of engagement with the periphery of the reduced end 90. To rotate the roll 50 it is merely necessary to grasp the up-turned end 97 of the finger 93, press slightly downward and draw forward. The frictional engagement between the fingers 93 and end 90 will then rotate the roll. Upon releasing the finger 93 the spring 96 lifts said finger and the spring 95 restores it to normal position. The roll 50 may also be provided, as shown in Figure 18, with a water scraper or squeeze 98 to remove excess water. In Figure 11ᵃ is shown in detail the arrangement of the bell crank lever 71 and link 72, and it will there be seen that the link 72 has its upper part of inverted U-shape so that the lever 74 may lie outside of the base while the link extends downwardly through a suitable opening in the top of said base.

In the form of the invention shown in Figures 21 to 27 a modification of the hand operated machine is disclosed. In this form the standards 13 are dispensed with, and a hole is formed in the back of the casing by cutting away the cover plate 11 and inserting movable side plates 99 secured to the bottom of the base adjustably by means of bolts 100. The roll in this case is simply dropped in this well and the web passes beneath a guide plate 101 to a printing mechanism indicated in general at 102, this mechanism being similar to that shown and described in the aforesaid patent. From the printing mechanism the web passes beneath the severing mechanism which has the usual supporting bar 37 extending through the lugs 36, and on this supporting bar is mounted a slightly modified knife frame 103 carrying the serrated knife 104. A guide plate 105 is positioned in front of the bar 37 and the web W passes beneath this guide plate and over an opening 106 corresponding to the opening 33. The frame 103 carries an elastic pad 107 preferably of rubber or the like and which, when the frame is depressed, bears downwardly on the web during the severing operation, and this pad and the frame are provided with registered openings 108 corresponding to the opening 106. In this form there projects from the side of the frame 103 an ear 109 to which is connected one end of a coil spring 110, having its other end connected to a lever 111 which is pivoted intermediate its ends on a bolt 112 projecting laterally from the side of the base. A coil spring 113 normally holds the front end of this lever raised, and said front end is provided with a finger piece 114 by means of which it may be depressed. Presser plates 115 are carried by the cover plate to hold the web against the usual moistening roll 50, and said web passes between headed guide pins 116 which may be positioned selectively in openings 117 in the cover plate 11. Within the base 10 are guides 118 where through passes a tab cutting and bending knife 119 of the conventional U-shaped cross section. This knife rests on a lever 120 supported in a bracket 121, see Figure 22, and having an end 122 projecting laterally through a slot 123 formed in the side of the base, the projecting end lying in the path of the lever 111. In the operation of this form depression of the front end of the lever 111 brings down the severing blade 104 and after the severing is accomplished the pad 107 will press against the web W and prevent further movement of the blade. However, the spring 110 will yield so that the lever 111 will engage the projecting end 122 of the lever 120 and thereby raise the cutter 119, thus cutting and bending upward a tab T.

In the slightly modified form shown in Figure 25 the frame 103 not only carries the severing blade 104 but also carries a tab cutting blade 124, the cutting blade 119 being eliminated in this form. The blade 124 is supported on a base having a recess 125 therein at what may be termed the basal end of the blade, and in place of the cutter 119 the lever 120 supports a folding finger 126 which, when raised, tucks the tab T into the recess 125, thus bending the tab to the form shown in Figure 26 so that the free end of the tab is brought against the basal part with the gummed side inward. With the tab thus formed there is no possibility of getting gum on the fingers. The tab may also be formed at the extreme end by a slight change in the position of the blade 108 and knife 119 so that the resulting end of the web is as shown in Figures 29 and 30.

In the second electrically operated form of the invention the construction is shown in Figures 31 to 43, and in this form there is provided a vertical solenoid 127 having a core 128. The cutting mechanism is similar to that shown in Figure 1, but the core 128 carries at its upper end a Y-shaped arm 129, having the ends of the Y bent downwardly to engage the cross piece of yoke lever 130 having its forward ends pivoted to the base 10 as at 131. The sides of this yoke lever are connected to the usual arms 40 by links 132 and actuate the severing and tab forming mechanism. The tab bending finger 133 is carried by a bent lever 134 pivoted as at 135, and having a downwardly extending leg 136 provided with a foot 137 which is engaged by the member 129 upon the solenoid core being moved downwardly. Thus, after the severing operation the bending finger is moved up as before, and then drops back by gravity. In the top of the water tank 138 is formed a well or slot 139 wherein rests a bar yoke 140, best seen in Figure 37. This yoke supports a shaft 141 which carries forwardly and upwardly extending arms 142 provided with fingers 143 directed toward each other and under which the web W passes. One of the arms 142 is continued a U-shaped spring contact 145, one leg of the U being longer than the other. Mounted on an insulating block 146 is a pair of spring contacts 145, while the other is normally disengaged from said contact. These parts correspond in character and function to the contacts 80 and 82. A spring 148 normally holds the contact 145 raised.

Obviously, if the free end of the web W be lifted the contact 145 will be depressed and established connection between the contacts 147. Thus the operation is identical with that previously described. A spring pressed arm 149 holds the core 128 normally raised.

The form of the invention shown in Figures 35 and 36 is similar to those previously described but in order to protect the user from injury by the blades side guards 150 are secured to the sides of the base 10, and these side guards support shafts 151 whereon are mounted arcuate guard plates 152 connected to the cutter frame 39 by links 153. Thus, whenever the cutters are depressed the plates will swing forwardly out of the way of these cutters.

The form of the device shown in Figures 39 to 44 illustrates a second modification of the hand operated machine, and in this form the operating lever takes the shape of a yoke lever extending along the sides and across the back of the base 10, the side members of this lever being pivoted to the base adjacent to the rear end, as at 154. The front ends of these side members carry a finger plate 155. A spring 156 normally holds these front ends raised. Links 157 connect the cutter frame 39 to the yoke lever, and in place of the spring gripping finger of the form shown previously, there is provided a spring finger 159 which has its free and projecting end from the frame and provided with a pad 159 engaging the moistening roll 50 upon depression so that in case paper is passing over the moistening roll this finger 138 will grip and hold the same during the cutting. The yoke lever carries a transverse yoke 160, having in each arm a slot 161 where through extends a finger 162 projecting from a tab bending frame 163 supported beneath the cover plate 11 on lugs 164. This frame is provided with the usual tab lifting finger 165. Thus, when the plate 155 is depressed the yoke 160 will be drawn downwardly, and at the same time the severing mechanism will operate.

The timing is such that just after the tab is cut the fingers 162 are engaged by the ends of the slots 161 and the bending mechanism is thereby brought into play. At one end 166 is shown the tab guard for this form, which prevents the tab being turned downwardly, this being best seen in Figure 44. In Figures 47 and 48 a modification of the cross yoke 160 is shown. In this modification the cross member of the yoke consists of a rubber sleeve 167, supported on a rod 168 carried by the side members of the yoke. With this form the sleeve not only acts to grip the web W during the severing operation, but also greatly assists in starting the cutting mechanism in its movement toward normal.

In the form of the invention shown in Figures 49 and 50 the device has been disclosed as mounted on an ordinary base 169 supporting a frame 170 which carries the solenoid 171 operating the yoke 172 which is connected to the rear ends of levers 173, in turn connected to the frame 39 by links 174. The blade in this case has an offset little portion 175 which forms the tab T at the end of the web during the severing operation, and this web passes beneath the usual contact making fingers 176 which bring the contact 177 into engagement with a pair of contacts 178 to disclose the circuit through the solenoid. The tab lifting mechanism is seen at 179 and a spring 180 holds the levers 173 normally raised against the action of the solenoid 171. Substantially, the only difference between this form and those previously described is, without exception of the offset 175 in the blade, that the working mechanism is all exposed. The operation of this form is practically the same as those previously described.

It will be noted from Figure 6 that small protuberences 180' are provided on the cover plate to keep the gummed tape from sticking thereto.

Figure 51 shows a modification of the means for rotating the moistening roll. In this case allotted standards 181 are mounted on the cover plate and support a friction roller 182 which rests on the tape or web and carries a bevelled gear 183 which meshes with a pinion 184 on a shaft 185. On this shaft is also a bevelled gear 186 which meshes with a gear 187 carried by the moistening roll 188. Thus, when the web is drawn forwardly the moistening roll will be rotated.

In Figure 52 is shown the preferred form of teeth for the severing blade and it will be seen that one side 189 of each tooth is perpendicular while the cutting edge 190 is inclined. I have found that this form of tooth requires less power and is more efficient.

It will be noted that the pivoting of the arms 87 which are below the top of the roller 50 permits them to be swung forwardly so as to allow the tank to be drawn out without it being necessary to remove the arms or top 11, the forward position being shown for one arm in dotted lines in Figure 19. This figure also shows these arms equipped with rubber pads 87' which serve to grip the paper drawn beneath them and prevent slipping when the paper is raised to actuate the circuit closer.

In the tab as shown in Figure 15 the wavy contour at the edge of the opening provides for accumulation of water so that, when the tape is applied to a package, the tab may be pressed down and will stick at its edges to such package.

In the form shown in Figures 31 and 38 there is provided at tank top 11' having angled side flanges 191 which prevent lateral movement of this top while cut out and downwardly struck ribs 192 fit the well 139 and prevent longitudinal movement of the top. In Figure 31 it will also be noted that the tank is provided with a hinged flood gate or baffle 193 which permits the water in the tank to flow back to the rear of the tank but only allows it to flow slowly toward the front. This prevents surging and spilling of the water.

In the form shown in Figure 39 a gravity device is provided for the roll so that, as the roll becomes small and light it will still engage the base with proper friction to maintain requisite tension during the cutting operation. To this end the standards 194 are provided with slots 195 to receive the shaft 196 of the paper roll 21. Weights 197 sliding in guides 198 engage the ends of the shaft and thus hold the paper roll in proper frictional contact with the base.

It will be noted that the gripping device 159 in Figure 39 is only used where heavy paper is used in the machine to add to the gripping effect obtained by the plates 52.

In Figures 53 to 56 there is shown a machine arranged for electrical operation and disclosing the manner in which the attachments, such as are shown in Figure 25 and in the gates or guards of Figure 35, may be used with the machine disclosed in Figure 1 or the machine disclosed in Figure 10 without materially departing from the construction thereof. Accordingly, the various parts here shown have been given the same numbers or reference characters as in the previously described and illustrated forms of the machine and it is not deemed necessary to again enter into specific descriptions of these forms. It is, however, deemed advisable to call attention to the fact that in applying the folder or attachment shown in Figure 25 to the machine of Figure 1 it is merely necessary to remove the two small bolts or screws which hold the cutter 56 and to use similar bolts or screws for securing the cutter 124 in place thereof. Obviously, when this is done the tab folder 126 and its lever 120 will be set in the machine, the tank 47 of Figure 10 being shortened to permit this to be done but the parts otherwise remaining the same as in that figure except that the lever 74 has an offset 74' corresponding identically in function with the offset portion of the similar lever shown in Figure 21. In like manner the side wings 150 and swinging guards 152 are simply secured to the machine of Figure 1 just as they are secured in Figure 35, the operation and function being identical.

Having thus described the invention, what is claimed as new, is:

1. In a machine for dispensing tape like material, a base over which the material passes, a cutter frame carrying a tape severing knife and mounted on the base to move the knife across the path of the tape, a tab cutter operatively associated with the cutter frame and arranged to partially sever a portion of the tape from the remainder to form a tab, and means operated by the movement of the cutter frame and arranged to force the partially secured tab portion of the tape upwardly out of the plane of the remainder of the tape and into position to be grasped by the fingers of the operator, and last means being further arranged to double the tab upon itself.

2. In a machine for dispensing gummed tape, a base over which the tape passes, a tab cutter carried by the base and arranged to move across the path of a tape passing through the machine and partially sever a portion of the tape from the remainder, and a tab folder operating in sequence to the cutter and arranged to bend the tab out of the path of the body of the tape and to fold the bent portion upon itself.

3. In a machine for dispensing lengths of tape, means for cutting off a length of tape, and other means operably associated therewith for forming a finger grip tab on the remainder of the tape at the end from which the length is cut off, said last means including a cutter for partially severing the tab and a bending device for bending the tab position out of the plane of the remainder of the tape, the bending device being further arranged to double the tab upon itself.

4. In a machine for dispensing lengths of tape, a base over which the tape is moved, a cutter frame swingingly mounted on the base, a severing blade carried by the cutter frame, a tab cutter carried by the cutter frame and arranged to cut a tab in the unsevered portion of the tape simultaneously with the severing of a portion of said tape, and a tab bending device operable by the movement of the cutter frame and arranged to force the cut tab upwardly from the base, the bending device being further arranged to double the tab upon itself.

5. In a machine for dispensing lengths of tape, a base over which the tape is moved, a cutter frame swingingly mounted on the base, a severing blade carried by the cutter frame, a tab cutter carried by the cutter frame and arranged to cut a tab in the unsevered portion of the tape simultaneously with the severing of a portion of said tape, a tab bending device operable by the movement of the cutter frame and arranged to force the cut tab upwardly from the base, the bending device being further arranged to double the tab upon itself, and means to support the tab against downward movement during the cutting operation.

6. In a machine for dispensing lengths of tape, a base over which the tape is moved, a cutter frame swingingly mounted on the base, a severing blade carried by the cutter frame, a tab cutter carried by the cutter frame, and arranged to cut a tab in the unsevered portion of the tape simultaneously with the severing of a portion of said tape, a tab bending device operable by the movement of the cutter frame and arranged to force the cut tab upwardly from the base, revoluble guard means in front of said cutter frame, and an operative connection between the cutter frame and guard means to move the guard out of the path of the cutter frame upon movement of the latter for cutting.

7. In a machine for dispensing lengths of tape, a base over which the tape is moved, a cutter frame swingingly mounted on the base, a severing blade carried by the cutter frame, a tab cutter carried by the cutter frame, and arranged to cut a tab in the unsevered portion of the tape simultaneously with the severing of a portion of said tape, a tab bending device operable by the movement of the cutter frame and arranged to force the cut tab upwardly from the base, means to support the tab against downward movement during the cutting operation, movable guard means in front of said cutter frame, and an operation connection between the cutter frame and guard means to move the guard out of the path of the cutter frame upon movement of the latter for cutting.

8. In a machine for dispensing lengths of tape, a base over which the tape is moved, a cutter frame swingingly mounted on the base, a severing blade carried by the cutter frame, a tab cutter carried by the cutter frame, and arranged to cut a tab in the unsevered portion of the tape simultaneously with the severing of a portion of said tape, a tab bending device operable by the movement of the cutter frame and arranged to force the cut tab upwardly from the base, vertical posts supported from the base at each side and in front of the cutter frame, guard plates pivotally mounted on the posts and extending normally in across the front of the cutter frame, and links connecting the guard plates and frame to move the plates as the frame is moved.

9. In a machine for dispensing lengths of tape, a base over which the tape is moved, a cutter frame swingingly mounted on the base, a severing blade carried by the cutter frame, a tab cutter carried by the cutter frame, and arranged to cut a tab in the unsevered portion of the tape simultaneously with the severing of a portion of said tape, a tab bending device operable by the movement of the cutter frame and arranged to force the cut tab upwardly from the base, means to support the tab against downward movement during the cutting operation, vertical posts supported from the base at each side and in front of the cutter frame, guard plates pivotally mounted on the posts and extending normally in across the front of the cutter frame, and links connecting the guard plates and frame to move the plates as the frame is moved.

10. In a device of the kind described, a base, a web severing and tab cutting device carried by the base, means to grip and hold the web during the severing and tab forming operation, electrical operating means connected to the web severing and tab cutting mechanism for operating the same, a circuit closer for said electrical operating means carried by the base and having an operating element spaced slightly from the path of the tape adjacent its point of issue from the machine whereby deflection of the tape may engage the operating element and operate the circuit closer.

11. In a web dispensing machine, a base, a web severing device mounted on said base and movable into and out of web severing position, a web gripping finger adapted to engage the web and clamp it against the base upon the severing device being moved to severing position, electrical operating means connected to the web severing device for operating the same, a circuit closer for said electrical operating means carried by the base and having an operating element spaced slightly from the path of the tape adjacent its point of issue from the machine whereby deflection of the tape may engage the operating element and operate the circuit closer.

12. In a machine for dispensing tape-like material, a base, a cutter frame swingingly mounted on said base, a severing knife carried by the cutter frame, a tab cutting mechanism operably associated with the cutter frame, means actuated by the movement of the cutter frame and arranged to bend the cut tab out of the plane of the material, electrical means for operating the cutter frame, a circuit closer for said electrical operating means carried by the base and having an operating element spaced slightly from the path of the tape adjacent its point of issue from the machine whereby deflection of the tape may engage the operating element and operate the circuit closer.

13. In a machine for dispensing tape-like material, a base over which the material passes, a cutter frame carrying a tape severing knife and mounted on the base to move the knife across the path of the tape, a tab cutter operatively associated with the cutter frame and arranged to partially sever a portion of the tape from the remainder to form a tab, means operated by the movement of the cutter frame and arranged to force the partially severed tab portion of the tape upwardly out of the plane of the remainder of the tape into position to be grasped by the fingers of the operator, electrical means for operating the cutter frame, a circuit closer for said electrical operating means carried by the base and having an operating element spaced slightly from the path of the tape adjacent its point of issue from the machine whereby deflection of the tape may engage the operating element and operate the circuit closer.

14. In a machine for dispensing lengths of tape, means for cutting off a length of tape, other means operably associated therewith for forming a finger grip tab on the remainder of the tape at the end from which the length is cut off, electrical means for operating the cutter frame, a circuit closer for said electrical operating means carried by the base and having an operating element spaced slightly from the path of the tape adjacent its point of issue from the machine whereby deflection of the tape may engage the operating element and operate the circuit closer.

15. In a machine for dispensing lengths of tape, means for cutting off a length of tape, other means operably associated therewith for forming a finger grip tab on the remainder of the tape at the end from which the length is cut off, said last means including a cutter for partially severing the tab and a bending device for bending the tab position out of the plane of the remainder of the tape, electrical means for operating the cutter frame, a circuit closer for said electrical operating means carried by the base and having an operating element spaced slightly from the path of the tape adjacent its point of issue from the machine whereby deflection of the tape may engage the operating element and operate the circuit closer.

16. In a machine for dispensing lengths of tape, means for cutting off a length of tape, other means operably associated therewith for forming a finger grip tab on the remainder of the tape at the end from which the length is cut off, said last means including a cutter for partially severing the tab and a bending device for bending the tab position out of the plane of the remainder of the tape, the bending device being further arranged to double the tab upon itself, electrical means for operating the cutter frame, a circuit closer for said electrical operating means carried by the base and having an operating element spaced slightly from the path of the tape adjacent its point of issue from the machine whereby deflection of the tape may engage the operating element and operate the circuit closer.

17. In a machine for dispensing lengths of tape, a base over which the tape is moved, a cutter frame swingingly mounted on the base, a severing blade carried by the cutter frame, a tab cutter carried by the cutter frame, and arranged to cut a tab in the unsevered portion of the tape simultaneously with the severing of a portion of said tape, a tab bending device operable by the movement of the cutter frame and arranged to force the cut tab upwardly from the base, electrical means for operating the cutter frame, a circuit closer for said electrical operating means carried by the base and having an operating element spaced slightly from the path of the tape adjacent its point of issue from the machine whereby deflection of the tape may engage the operating element and operate the circuit closer.

18. In a machine for dispensing lengths of tape, a base over which the tape is moved, a cutter frame swingingly mounted on the base, a severing blade carried by the cutter frame, a tab cutter carried by the cutter frame and arranged to cut a tab in the unsevered portion of the tape simultaneously with the severing of a portion of said tape, a tab bending device operable by the movement of the cutter frame and arranged to force the cut tab upwardly from the base, the bending device being further arranged to double the tab upon itself, electrical means for operating the cutter frame, a circuit closer for said electrical operating means carried by the base and having an operating element spaced slightly from the path of the tape adjacent its point of issue from the machine whereby deflection of the tape may engage the operating element and operate the circuit closer.

19. In a machine for dispensing lengths of tape, a base over which the tape is moved, a cutter frame swingingly mounted on the base, a severing blade carried by the cutter frame, a tab cutter carried by the cutter frame, and arranged to cut a tab in the unsevered portion of the tape simultaneously with the severing of a portion of said tape, a tab bending device operable by the movement of the cutter frame and arranged to force the cut tab upwardly from the base, means to support the tab against downward movement during the cutting operation, electrical means for operating the cutter frame, and a circuit closer for the electrical means operable by the tape drawn off from the machine.

20. In a machine for dispensing lengths of tape, a base over which the tape is moved, a cutter frame swingingly mounted on the base, a severing blade carried by the cutter frame, a tab cutter carried by the cutter frame and arranged to cut a tab in the unsevered portion of the tape simultaneously with the severing of a portion of said tape, a tab bending device operable by the movement of the cutter frame and arranged to force the cut tab upwardly from the base, the bending device being further arranged to double the tab upon itself, means to support the tab against downward movement during the cutting operation, electrical means for operating the cutter frame, a circuit closer for said electrical operating means carried by the base and having an operating element spaced slightly from the path of the tape adjacent its point of issue from the machine whereby deflection of the tape may engage the operating element and operate the circuit closer.

21. In a machine for dispensing lengths of tape, a base over which the tape is moved, a cutter frame swingingly mounted on the base, a severing blade carried by the cutter frame, a tab cutter carried by the cutter frame, and arranged to cut a tab in the unsevered portion of the tape simultaneously with the severing of a portion of said tape, a tab bending device operable by the movement of the cutter frame and arranged to force the cut tab upwardly from the base, a revoluble guard means in front of said cutter frame, an operative connection between the cutter frame and guard means to move the guard out of the path of the cutter frame upon movement of the latter for cutting, electrical means for operating the cutter frame, a circuit closer for said electrical operating means carried by the base and having an operating element spaced slightly from the path of the tape adjacent its point of issue from the machine whereby deflection of the tape may engage the operating element and operate the circuit closer.

22. In a machine for dispensing lengths of tape, a base over which the tape is moved, a cutter frame swingingly mounted on the base, a severing blade carried by the cutter frame, a tab cutter carried by the cutter frame, and arranged to cut a tab in the unsevered portion of the tape simultaneously with the severing of a portion of said tape, a tab bending device operable by the movement of the cutter frame and arranged to force the cut tab upwardly from the base, means to support the tab against downward movement during the cutting operation, movable guard means in front of said cutter frame, an operation connection between the cutter frame and guard means to move the guard out of the path of the cutter frame upon movement of the latter for cutting, electrical means for operating the cutter frame, a circuit closer for said electrical operating means carried by the base and having an operating element spaced slightly from the path of the tape adjacent its point of issue from the machine whereby deflection of the tape may engage the operating element and operate the circuit closer.

23. In a machine for dispensing lengths of tape, a base over which the tape is moved, a cutter frame swingingly mounted on the base, a severing blade carried by the cutter frame, a tab cutter carried by the cutter frame, and arranged to cut a tab in the unsevered portion of the tape simultaneously with the severing of a portion of said tape, a tab bending device operable by the movement of the cutter frame and arranged to force the cut tab upwardly from the base, vertical posts supported from the base at each side and in front of the cutter frame, guard plates pivotally mounted on the posts and extending normally in across the front of the cutter frame, links connecting the guard plates and frame to move the plates as the frame is moved, electrical means for operating the cutter frame, a circuit closer for said electrical operating means carried by the base and having an operating element spaced slightly from the path of the tape adjacent its point of issue from the machine whereby deflection of the tape may engage the operating element and operate the circuit closer.

24. In a machine for dispensing lengths of tape, a base over which the tape is moved, a cutter frame swingingly mounted on the base, a severing blade carried by the cutter frame, a tab cutter carried by the cutter frame, and arranged to cut a tab in the unsevered portion of the tape simultaneously with the severing of a portion of said tape, a tab bending device operable by the movement of the cutter frame and arranged to force the cut tab upwardly from the base, means to support the tab against downward movement during the cutting operation, vertical posts supported from the base at each side and in front of the cutter frame, guard plates pivotally mounted on the posts and extending normally in across the front of the cutter frame, links connecting the guard plates and frame to move the plates as the frame is moved, electrical means for operating the cutter frame, a circuit closer for said electrical operating means carried by the base and having an operating element spaced slightly from the path of the tape adjacent its point of issue from the machine whereby deflection of the tape may engage the operating element and operate the circuit closer.

25. In a machine for dispensing tape like material, a base over which the material passes, a cutter frame carrying a tape severing knife and mounted on the base to move the knife across the path of the tape, a tab cutter operatively associated with the cutter frame and arranged to partially sever a portion of the tape from the remainder to form a tab, means operated by the movement of the cutter frame and arranged to force the partially severed tab portion of the tape upwardly out of the plane of the remainder of the tape and into position to be grasped by the fingers of the operator, guard means pivoted to and extending up from the base in front of said knife and tab cutter, and an operative connection between the guard means and cutter frame to move the guard forwardly upon actuation of the cutter frame, said guard means normally being positioned between the frame and the cutter tab.

26. In a machine for dispensing lengths of tape, means for cutting off a length of tape and for forming a finger grip tab on the remainder of the tape at the end from which the length is cut off, and means for bending the tab portion out of the plane of the remainder of the tape and doubling said tab portion upon itself.

27. In a machine for dispensing lengths of tape, a base over which the tape is moved, said base being provided with a multiplicity of small raised points holding the tape from contact with the general surface of the base, a cutter frame swingingly mounted on the base, a severing blade carried by the cutter frame, a tab cutter carried by the cutter frame, and arranged to cut a tab in the unsevered portion of the tape simultaneously with the severing of a portion of said tape, and a tab bending device operable by the movement of the cutter frame and arranged to force the cut tab upwardly from the base.

In testimony whereof I affix my signature.

WILLIAM A. UTTZ, Sr.